United States Patent Office 2,716,450
Patented Aug. 30, 1955

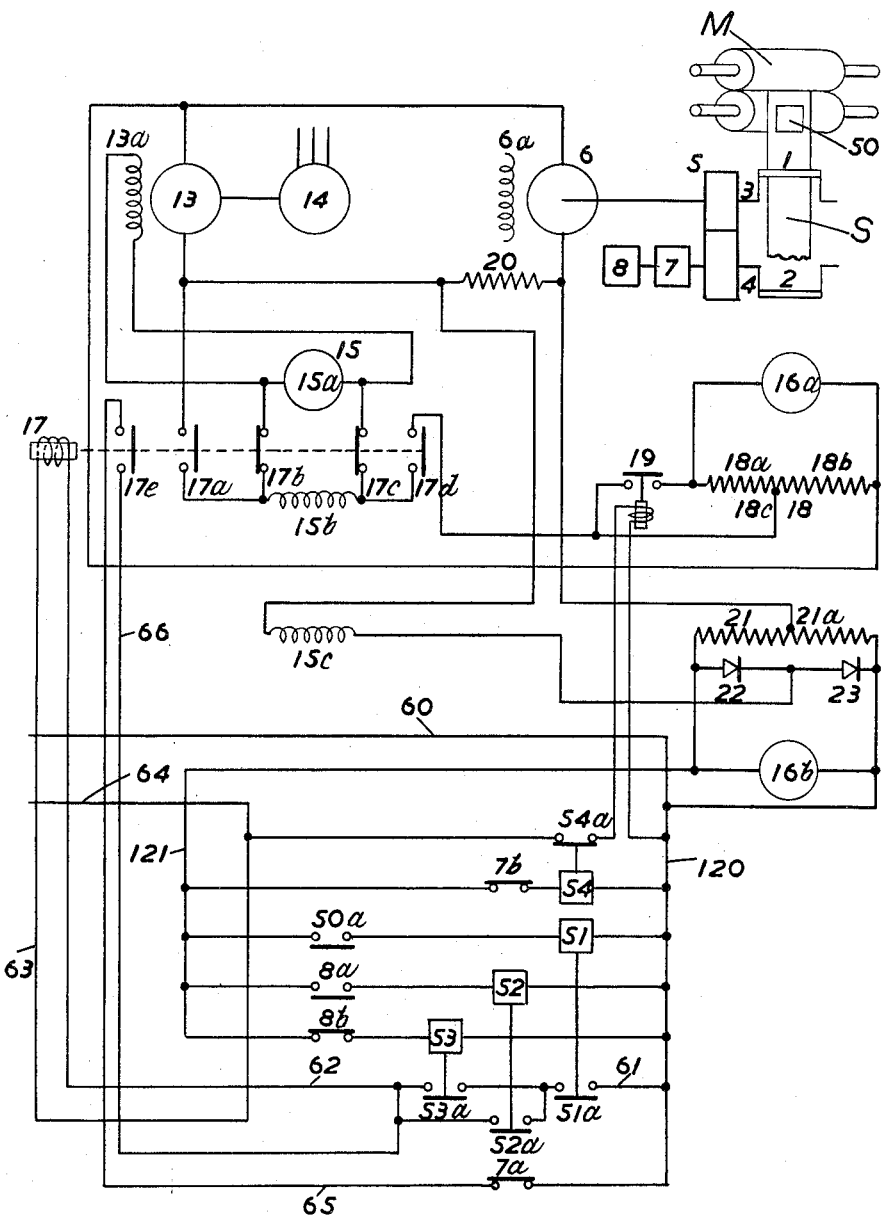
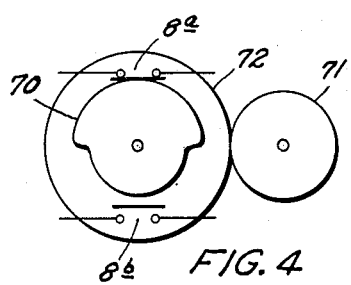
FIG. 1
FIG. 4

2,716,450

MACHINES FOR ACTING AT SPACED POINTS ON STRIP OR LIKE MATERIAL

George Galloway Nicholson, Sheffield, England, assignor to Davy and United Engineering Company Limited, Sheffield, England Application July 17, 1951, Serial No. 237,136

Claims priority, application Great Britain July 25, 1950

10 Claims. (Cl. 164—68)

This invention relates to machines for acting at spaced points on running strips of material. For example, the machine may be arranged to shear off predetermined lengths of the material or to mark it at selected points.

One object of the present invention is to provide a machine in which the operation of the tool for cutting, marking or otherwise treating the strip, automatically adjusts itself to any variations in the speed of movement of the strip so that the spaces between the points at which the tool acts are substantially unaffected. A further object is to provide means whereby the spaces may be adjusted at will. Yet another object is to arrange for the ready adjustment of the position of the first point in a series of points with respect to the strip; in other words, the adjustment of the phase relationship between the strip and series of points.

According to the invention, the tool is arranged to undergo cyclic movements, the time of each movement being a function of the velocity of the strip, and means are provided for controlling the intervals between the movements, each such interval also being a function of the velocity of the strip. The spacing of the points is thereby rendered substantially independent of any variations in strip speed. The said time and the said interval, while remaining functions of the strip velocity, may be controlled at will to alter the spacing of the said points. Advantageously the tool may be arranged to undergo rotary movement and each cycle may then consist of one revolution including a phase of acceleration to a predetermined speed and a phase of deceleration from that speed, the time of each such phase being constant. Means may be employed for varying the time of initiation of the first rotation in relation to the movement of the strip.

Conveniently electronic timers of the kind in which a condenser is charged through a resistance network as in the well known Miller integrator or "Bootstrap" circuit may be used for adjusting the action of the machine. Thus, there may be two such timers operating alternately for initiating each cyclic movement subsequent to the first one, another controlling the length of each movement, and yet another for timing the commencement of the initial movement. Each such timer preferably gives a time $$\frac{X}{V} - B$$

where X and B may be adjusted at will and V is the strip velocity.

In order that the invention may be clearly understood and readily carried into effect, one apparatus in accordance therewith will now be described, by way of example, with reference to the accompanying drawings, in which:

Figure 1 is an electrical circuit diagram;

Figure 4 is a diagram showing in detail a further part of Figure 1.

Figure 2:
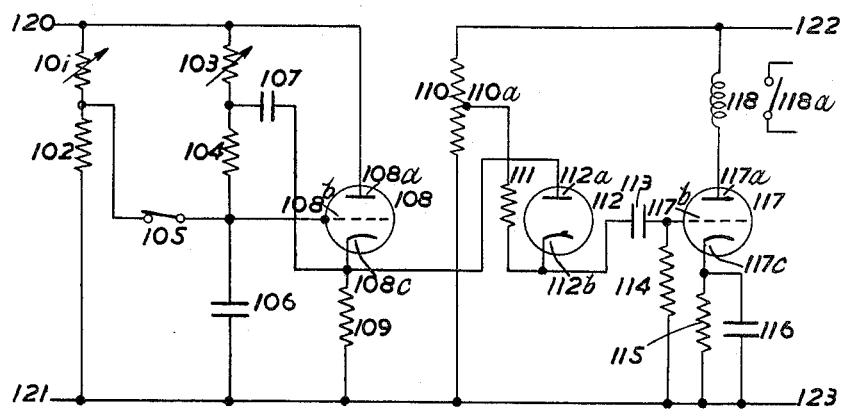
Figure 2 is an electrical circuit diagram showing in detail a part of Figure 1.

In this example, the tool comprises a pair of shear elements 1, 2 mounted respectively on crank arms 3, 4 geared together at 5 so as to rotate in opposite directions at equal speeds and act simultaneously on opposite faces of a running length of strip material. Thus, the strip S emerging from rolling mill M is severed at each revolution of the pair of shear elements. At the beginning of each such cycle the tool is accelerated constantly from rest to a velocity V (Figure 3), the value of which is such that the circumferential speed of the shear elements is equal to the linear speed of the strip material. At the end of each revolution the tool is decelerated to rest. The tool is driven by a D. C. motor 6 forming part of a Ward Leonard system and having a field winding 6a supplied at a constant voltage. If the accelerating current for the shear motor is made directly proportional to the material speed, the time C of acceleration and deceleration is constant.

Thus, the total time taken for acceleration and deceleration is 2C and the total distance travelled by the shear in these two periods is CV, so that, if the total circumferential distance travelled by the shear is F, the portion of this distance travelled at velocity V is F−CV and the time taken to do this is $$\frac{1}{V}(F-CV)$$

Accordingly, the total time for the revolution is $$2C+\frac{1}{V}(F-CV)=C+\frac{F}{V}$$

During this time, the strip material travels a distance $$V\left(C+\frac{F}{V}\right)=CV+F$$

and this is the minimum length that can be cut. The period of each such cycle is controlled by a timing relay 54 which, in turn, is under the control of a limit switch 7, controlled directly by the tool and having contacts 7a and 7b which are closed substantially at the beginning of the cycle, this being in practice about 4° of arc after the cycle has started, and remain closed for approximately 330° of the cycle. The timing relay 54 is one of four such timing relays 51, 52, 53 and 54 which are of an electronic type that will be described below with reference to Figure 2. It will be appreciated that the timing relay 54 is arranged to close contacts 54a at the beginning of each cycle and to open them after the lapse of time $$\frac{F}{V}$$

The shortest distance between two cuts is, as indicated above, that corresponding to the time occupied by one cycle. Longer cuts are effected by introducing a time delay between the end of one cycle and the initiation of the next. This time delay is effected alternately by the timing relays 52 and 53. Thus, the relay 52 comes into action substantially at the beginning of one cycle, this being in practice about 6° of arc after the cycle has started and initiates the next cycle after a lapse of time $$\frac{G}{V}$$

at which instant the relay 53 comes into action, and so on. The distance travelled by the strip in each such period is obviously G and this is independent of the strip speed V. The alternate initiation of the operation of the timing relays 52 and 53 is effected by a limit switch 8 having contacts 8a and 8b allocated respectively to the two relays, the limit switch 8 being arranged to undergo one cycle for every two cycles of the tool. The reason why the two timers 52 and 53 are employed is so that time is given for the condenser in each to discharge completely at the end of its timing period, this being particularly necessary when the lengths of cut are a minimum or nearly a minimum. Details of the limit switch 8 appear in Figure 4 from which it will be seen that a cam 70 driven at half the speed of the shear elements 1, 2 is arranged to actuate the contacts $8a$, $8b$ every half revolution, the contacts $8a$ being opened when the contacts $8b$ are closed and vice versa.

In practice the aforesaid terms $$\frac{F}{V} \text{ and } \frac{G}{V}$$

may be considered as respectively having subtracted therefrom small adjustable amounts $B_1$ and $B_2$ equal to the very short periods of operation of the control systems on the completion of their timing operations.

The timing relay 51 is employed to determine the point at which the shear first cuts the strip. Now, supposing each shear element has to travel through a constant arc D from its point of rest to the cut, the first part of this movement will be an acceleration occupying time C so that the length of the second part of constant speed V will be $$D - \frac{CV}{2}$$

The time taken by the shear to travel this distance is $$\frac{1}{V}\left(D - \frac{CV}{2}\right)$$

and the total time for the arc D will be $$C + \frac{1}{V}\left(D - \frac{CV}{2}\right) = \frac{C}{2} + \frac{D}{V}$$

Now, supposing the timing relay 51 takes a time $$\frac{A}{V}$$

Figure 3:
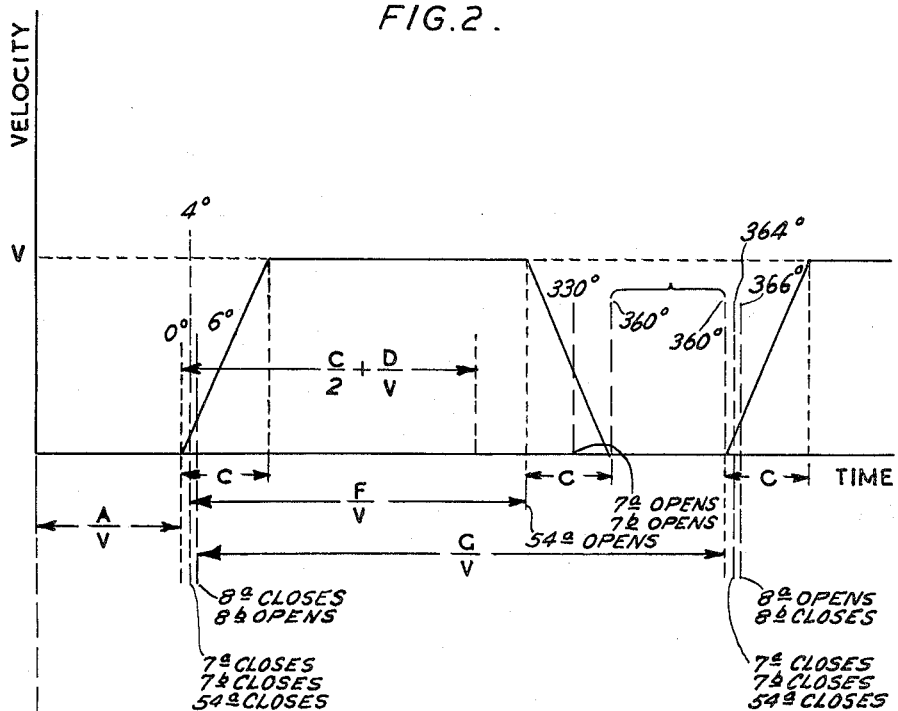
Figure 3 is a timing diagram.

Figure 3, to come into action, or $$\frac{A}{V} - B_3$$

if the period of operation of the control system on the completion of the timing operation is taken into account, the total distance travelled by the material before the cutter comes into action will be $$V\left(\frac{A}{V} - B_3\right) + V\left(\frac{C}{2} + \frac{D}{V}\right)$$

Then, if the front end of the material approaching the shear operates contacts $50a$ by means of a photo-cell or mechanical switch 50 and so energises the timing relay 51 a distance E before the shear, the length cut off is $$V\left(\frac{A}{V} - B_3\right) + V\left(\frac{C}{2} + \frac{D}{V}\right) - E$$

and this equals $$(A + D - E) - V\left(B_3 - \frac{C}{2}\right)$$

This is independent of V if $B_3$ is made equal to $$\frac{C}{2}$$

Moreover, the constants A, D and E may be arranged to be adjusted by the operator and, if required, the distance between the front end of the strip and the first cut may be made equal to the distance between consecutive cuts.

The electrical apparatus will now be described in detail. The motor 6 is energised by a D. C. generator 13 driven at a substantially constant speed by an A. C. induction motor 14 and provided with a field winding $13a$ connected to the armature $15a$ of a D. C. exciter machine 15. Since the generator 13 is driven at substantially constant speed, the voltage supplied to the motor 6 varies in accordance with the field winding $13a$. The exciter 15 is a high amplification exciter driven at constant speed by the motor 14 and provided with two field windings $15b$ and $15c$. The winding $15b$ is under the control of a switch operated by a relay 17 to take up either one of two positions. In the first of these, contactors $17b$ and $17c$ are closed as shown in Figure 1, while contactors $17e$, $17a$ and $17d$ are open, so that the armature $15a$ is connected across the field $15b$ to produce a cancelling or "suicide" effect to stop the motor 6. In the second position, the contactors $17e$, $17a$ and $17d$ are closed, while the contactors $17b$ and $17c$ are open. This results in the field $15b$ being supplied through the contactors $17a$ and $17d$ with a voltage equal to the difference between the voltage of the generator 13 and the whole or part of the voltage of a tachometer generator $16a$ which rotates at a speed corresponding directly to the linear speed of the strip material. The contactor $17e$ provides a holding circuit to maintain the contacts in the said second position.

The armature of the tachometer generator $16a$ is connected across a potentiometer 18, the limb $18a$ of which may be short circuited by a relay operated contactor 19 so that the full voltage of the tachometer generator $16a$ is connected across the limb $18b$ of the potentiometer 18. The tapping $18c$ of the potentiometer is connected to the contactor $17d$. When the field $15b$ is connected to measure the difference between the voltage across the armature 13 and the voltage across the limb $18b$, the field $13a$ of the generator is so excited that the voltage of the generator 13 is equal to the voltage across the limb $18b$.

The field $15c$ is a current limit control field winding and is excited in response to the difference between a reference voltage and a voltage derived from the current which flows in the armature circuit of the drive motor 6. This reference voltage is provided by a resistor 21 connected across a second tachometer generator $16b$ which is also responsive to the linear speed of the strip material. The resistor 21 has a centre tapping $21a$ to one side of a resistor 20 in the armature circuit of the motor 6. The ends of the resistor 21 are connected through reversely connected rectifiers 22, 23 to the current limit field $15c$ whilst the other side of the field winding $15c$ is connected to the other side of the resistor 20.

As a result of the inclusion of the rectifiers 22, 23, one half of the resistor 21 provides the reference voltage when the current flow in the armature circuit is in one direction and the other half provides the reference voltage when the current flow is in the opposite direction.

The voltage across the resistor 20 is a measure of the current flowing in the armature circuit of the motor 6. When the voltage across the resistor 20 is less than the reference voltage no current flows in the field winding $15c$ and no current limit takes place.

When the voltage across the resistor 20 is greater than the reference voltage, current flows in the field winding $15c$. Current flows in the winding $15c$ in such a direction that the flux of the field winding $15c$ opposes the flux of the winding $15b$. As a result of this differential action the current flowing in the armature of the motor 6 is limited to a predetermined value of magnitude corresponding to the magnitude of the reference voltage of the resistor 21 which is proportional to the speed, at which the material to be sheared is travelling.

As the front of the material approaches the shear it operates the contacts $50a$, as aforesaid, and so energises the timing relay 51 which is supplied with a constant voltage and also a voltage proportional to the material speed from the tachometer generator $16b$. The timing relays 51 . . . 54 are, as will appear below, of the type containing a condenser and a resistor connected across the voltage from the tachometer generator $16b$. The voltage across the condenser is compared with a fixed voltage and when the two have become equal, the contacts 51a, in the case of the timing relay 51, are caused to close. The time of operation of the timing relay 51 is inversely proportional to the voltage across the tachometer generator 16b, and is directly proportional to the value of the resistor connected in series with the condenser. Thus the delay of the timing relay is $$\frac{A}{V}$$

as required (Figure 3), where A may be adjusted by manually altering the resistance. By introducing a voltage proportional to the material speed in series with the charging condenser the delay characteristic may be altered to the value $$\frac{A}{V} - B_3$$

as aforesaid, where $B_3$ is proportional to the voltage introduced. When the contacts 51a are closed, the contacts 52a or the contacts 53a are also closed, so that a circuit is completed through the relay 17 causing the closure of the contactors 17e, 17a and 17d and so causing the motor 6 to start. This circuit extends from a source of current through conductors 60, 120, 61, 62, 63, 64 back to the source of current. The acceleration current for the motor 6 is limited to a value corresponding to the reference voltage across the resistor 21 so that the rate of acceleration is proportional to the speed of the material and the time of the acceleration is constant.

The closing of the contacts 7a as a result of the starting of the motor completes the holding circuit for the relay 17 from the current source through conductors 60, 120, 65, 66, 62, 63, 64 back to the source. The simultaneous closing of the contacts 7b sets the timing relay 54 to initiate the deceleration of the motor 6 after the aforesaid interval $$\frac{F}{V}$$

when its contacts 54a are opened causing the contactor 19 to be de-energised. The reference voltage from the potentiometer 18 is then reduced from the full voltage of the tachometer generator 16a to a voltage determined by the ratio of the limb 18b to the total resistance of the potentiometer 18. The resultant change in the excitation of the field 15b of the exciter 15 causes the exciter 15 to energise the field 13a of the generator 13 to reduce the voltage of the generator 13 and thus the speed of the motor 6 to a value proportional to the voltage across the resistance 18b. When, after the aforesaid 330° of arcuate movement, the contacts 7b are opened, the timing relay 54 is de-energised. At about the same time the holding circuit is opened at the contacts 7a, causing the contacts 17c and 17b to be closed so that the field 13a of the generator 13 is reduced rapidly to zero. The voltage of the generator 13 and the speed of the motor 6 are, therefore, reduced to zero, so completing one cycle of the tool.

At the beginning of the cycle the appropriate set of the limit contacts 8a, 8b is closed, thereby setting the associated one of the timing relays 52, 53 to close its contacts 52a or 53a after the appropriate period $$\left(\frac{G}{V}\right)$$

whereupon the relay 17 is energised once more to change over the contactors 17a ... 17e. It is to be understood that the contacts 51a are held closed so long as the photo electric or mechanical switch 50 indicates that the strip is running.

A typical timing relay circuit is shown in Figure 2. The condenser 106, in series with resistances 103, 104 is connected to conductors 120, 121 which are connected to the tachometer generator 16b. The rate of charge of the condenser is not, however, linear but exponential. This rate of charge is made linear by a triode valve 108, a condenser 107 and a cathode resistor 109 forming the well-known "bootstrap" generator circuit.

The triode valve 108 is connected as a cathode follower, the voltage across the cathode resistor 109 being almost equal to the voltage on the grid 108b. The cathode 108c is connected through the condenser 107 to the junction of the resistors 103, 104.

Thus, as the charge on the condenser 106 increases, the voltage across the cathode resistor 109 increases and the voltage at the junction of the resistors 103, 104 increases by the same amount causing the condenser charging current to remain constant and the voltage across condenser 106 to be equal to $$\frac{u.t}{c.r} = \frac{s.t}{q.r}$$

where $u$ is the voltage across the conductors 120, 121, $c$ is the capacity of the condenser 106, $t$ is the time from the start of the charging of the condenser 106, $r$ is the sum of the resistances 103, 104, $s$ is the speed of charging the condenser and $q$ is a constant. The condenser 106 may be given an initial charge by connecting one end of it to the junction of the two resistors 101, 102, by closing a switch 105.

The resistor 103 is made variable to give a variable time of operation and the resistor 101 is also made variable and the controls for the two resistors 101, 103 are connected together in such a manner that the voltage at the junction of the resistors 101, 102 is equal to $$\frac{v.b}{c.r} = \frac{s.b}{q.r}$$

where $b$ is normally a constant, adjustable at will by the resistor 101.

If the condenser 106 has an initial charge from the circuit 101, 102 and the switch 105 is opened, the time to reach a voltage R is $$\frac{q.r}{s}\left(R - \frac{s.b}{q.r}\right) = \frac{q.r.R}{s} - b$$

This may be expressed as $$\text{Time} = \frac{a}{s} - b$$

where $a$ may be varied by suitable alteration of the resistance 103. This expression is, of course, equivalent to the required expression $$\frac{x}{v} - B$$

which is necessary for the various timers 51 ... 54.

The voltage R is selected by a tapping 110a on a resistance 110 which is connected across a constant voltage supply 122, 123.

The tapping 110a is connected through a resistor 111 to the cathode 112b of a diode valve 112. The anode 112a of the diode valve 112 is connected to the cathode 108c of the triode valve 108. The voltage at the cathode 108c is produced by the voltage drop across the resistor 109 which is almost exactly equal to the voltage across the condenser 106 which is connected to the grid 108b of the triode valve 108. When the voltage of the cathode 108c rises to the value of the voltage of the tapping 110a the diode valve 112 conducts, causing the cathode 112b to become more positive. This increase of voltage is applied through the condenser 113 to the grid 117b of the triode valve 117. This grid 117b is connected to the conductor 123 through a high resistance 114. The triode valve 117 has a self biassing arrangement comprising a resistor 115 and a condensor 116 in the cathode circuit and a relay coil 118 in the anode circuit. The relay coil 118 is arranged so that it will not close the contacts 118a with the normal anode current of triode valve 117. When the increased voltage is applied to the grid 117b through the condenser 113, the anode current increases and the relay coil 118 causes the contacts 118a to close. The contacts 118a correspond, of course, to each of the sets of contacts 51a . . . 54a in Figure 1.

I claim:

1. A machine for acting at spaced points on continuously running strip material, the machine comprising, in combination, a tool mounted to act periodically on the strip, means for driving the tool through a series of discrete cyclic movements, means continuously responsive during each such movement to the speed of the strip for controlling the duration of the movement, and separate means continuously responsive to the speed of the strip during intervals between consecutive cycles for controlling the time of the interval between consecutive cycles.

2. A machine for acting at spaced points on continuously running strip material, the machine comprising, in combination, a tool mounted to act periodically on the strip, means for driving the tool through a series of discrete cyclic movements, each comprising a phase of uniform acceleration to a speed equal to the speed of the strip and an equal phase of uniform deceleration from that speed to zero speed, means responsive to the speed of the strip during each such movement for controlling the duration of the movement, and separate means continuously responsive to the speed of the strip during intervals between consecutive cycles for controlling the time of the interval between the beginning of each cycle and the beginning of the subsequent cycle.

3. A machine according to claim 1, further comprising means responsive to the speed of the strip for varying the time of initiation of the first cyclic movement in relation to the position of the front end of the strip with respect to the tool.

4. A machine according to claim 1, said means for controlling the duration of each cyclic movement comprising an electric timer including a condenser charged through a resistance network.

5. A machine for acting at spaced points on continuously running strip material comprising, in combination, a tool mounted to act periodically on the strip, means for driving the tool through a series of discrete cyclic movements, means continuously responsive to the speed of the strip during each such movement for controlling the duration of the movement, two timers each arranged to control the interval between predetermined instants in consecutive cycles and each responsive to the speed of movement of the strip, each timer comprising a condenser charged at a predetermined rate through a resistance network, and switch means actuated in timed relationship with the tool for initiating the operation of the timers alternately.

6. A machine for acting at spaced points on continuously running strip material comprising, in combination, a tool mounted to act periodically on the strip, means for driving the tool through a series of discrete cyclic movements, tachometer means responsive to the speed of the strip, means continuously responsive, during each said cyclic movement, to said tachometer means for controlling the duration of the movement, a switch responsive to the passage of the front end of the strip past a predetermined point, a timer having a condenser charged at a rate determined by said tachometer means, and means responsive to said timer for initiating the first movement in said series of movements when the charge on said condenser reaches a predetermined value.

7. A machine according to claim 5, each timer operating according to the function $$\frac{X}{V}$$

and further comprising means for controlling X at will, and a tachometer generator for impressing the factor $$\frac{1}{V}$$

on each timer, V being the velocity of the strip material.

8. A machine according to claim 1, said means for controlling the duration of each cyclic movement, and said means for controlling the interval between consecutive cyclic movements, each comprising a timer operating according to the function $$\frac{X}{V}$$

means for controlling X at will, and tachometer generator means for impressing the factor $$\frac{1}{V}$$

on each timer, V being the velocity of the strip material.

9. A machine for acting at spaced points on continuously running strip material comprising, in combination, a tool mounted to act periodically on the strip, a D. C. motor connected to drive the tool and having constant field excitation, a D. C. generator connected to supply current to said motor, means for driving said generator armature at constant speed, an exciter arranged to supply current to the generator field winding, two field windings for said exciter, two tachometer generators, one of said fields being responsive to one of said tachometer generators, and the other field responsive to means including the other said tachometer generator for causing the generator voltage to fall at a rate causing the tool to decelerate at a predetermined rate, and two timing means, each responsive to the speed of the strip, one of said timing means controlling the supply of current to said second-mentioned exciter field for timed periods, and the second of said timing means operative to initiate said timed periods at spaced intervals, whereby said motor drives said tool through discrete cycles of movement, having durations dependent on, and separated by intervals dependent on, the strip speed.

10. A control system for a rotary shear comprising means for controlling the shear motor to accelerate in a constant time to the speed of material approaching the shear and to decelerate to rest in the same time, means for causing the shear to start its individual cycles at periods of time inversely proportional to the material speed so that the cut lengths are independent of the material speed, means for timing the operation of the first cycle of the shear so that the first cut length is independent of the material speed, the last-mentioned means consisting of an electric timing relay of a type having a time cycle inversely proportional to applied voltage, and means for starting the deceleration of the shear motor after a time inversely proportional to the material velocity.

References Cited in the file of this patent

UNITED STATES PATENTS

| 1,900,252 | Morgan | Mar. 7, 1933 |
| 1,991,083 | Dean | Feb. 12, 1935 |
| 2,500,999 | Murrah | Mar. 21, 1950 |